United States Patent Office 3,060,041
Patented Oct. 23, 1962

3,060,041
GLASS COMPOSITIONS
Klaus Leopold Loewenstein, Camberley, England, assignor to Microcell Limited, London, England, a company of Great Britain
No Drawing. Filed Jan. 20, 1960, Ser. No. 3,490
11 Claims. (Cl. 106—50)

The invention relates to glass composition.

According to the present invention there is provided a glass composition which comprises a base glass with which is incorporated a proportion of at least one of the following ingredients to increase the Young's modulus of the base glass:

| | Percent |
|---|---|
| $TiO_2$ | Up to 27 |
| $ZrO_2$ | Up to 20 |
| $HfO_2$ | Up to 15 |
| $ThO_2$ | Up to 25 |
| $Ta_2O_5$ | Up to 15 |
| $Nb_2O_5$ | Up to 20 |

The percentages in this specification are percentages by weight on the total weight of the composition. The base glass may be comprised of

| | Percent |
|---|---|
| $SiO_2$ | From 20 to 50 |
| $Al_2O_3$ | From 0 to 20 |
| $CaO$ | From 15 to 25 |
| $MgO$ | From 10 to 22 |

Preferably the ingredient incorporated in the glass composition to increase the Young's modulus of the base glass is present in the following proportion:

| | Percent |
|---|---|
| $TiO_2$ | From 10 to 23 |
| $ZrO_2$ | From 10 to 18 |
| $HfO_2$ | From 8 to 13 |
| $ThO_2$ | From 12 to 22 |
| $Ta_2O_5$ | From 10 to 12 |
| $Nb_2O_5$ | From 5 to 15 |

Preferably the base glass is comprised of:

| | Percent |
|---|---|
| $SiO_2$ | From 25 to 50 |
| $Al_2O_3$ | From 3 to 8 |
| $CaO$ | From 10 to 20 |
| $MgO$ | From 7 to 15 |

It is preferred that the base glass consists of $SiO_2$, $Al_2O_3$, CaO and MgO present in a total amount of from 50 to 90 percent.

It is preferred that the ingredient or ingredients which increase the Young's modulus of the base glass is or are present in a total amount of from 10 to 45 percent.

The invention also includes a glass composition which comprises from 50 to 90 percent of a base glass consisting of:

| | Parts |
|---|---|
| $SiO_2$ | From 25 to 50 |
| $Al_2O_3$ | From 3 to 10 |
| $CaO$ | From 10 to 15 |
| $MgO$ | From 7 to 15 | and with which is incorporated one of the following ingredients to increase the Young's modulus of the base glass:

| | Percent |
|---|---|
| $TiO_2$ | From 10 to 20 |
| $ZrO_2$ | From 8.5 to 12 |
| $HfO_2$ | From 8 to 10 |
| $ThO_2$ | From 10 to 12.5 |

The compositions according to this invention may also include from 0.1 to 2.0 percent of $Li_2O$, from 0.1 to 5.0 percent of MnO, from 1 to 10 percent of $B_2O_3$ or from 0.05 to 1 percent of CoO. Preferably CoO, when present, is present in an amount of 0.1 to 0.5 percent.

The addition of MnO or $Li_2O$ enables in certain cases, the glass composition to contain a higher proportion of one of the ingredients to increase the Young's modulus of the base glass. For example the addition of MnO or $Li_2O$ enables a greater amount of $TiO_2$ to be incorporated into a base glass.

It is to be understood that the compositions of the glasses according to the present invention must be so chosen that a glass is obtained which upon cooling does not devitrify; by this is meant that a suitable glass would not include 27 percent $TiO_2$ and 20 percent $ZrO_2$ as a composition so formulated would devitrify and would not be, therefore, a glass composition.

The glass may be made, as is normal in this art, by mixing together the raw materials e.g. sand, limespar, zirconia and other ingredients in such proportions that the resulting glass will have the desired composition. The mixed raw materials may be fed into a platinum alloy crucible and placed in a furnace which may be heated by gas and electricity or other fuel. In order to fuse the ingredients, temperatures of about 1550° C. are required. After fusion is completed, the molten glass is preferably stirred for 30 to 45 minutes to achieve homogeneity, and then cast into an iron mould and quickly transferred to an annealing furnace for slow cooling.

The present invention also includes glass fibres when made from a composition according to the present invention.

The examples in the following table illustrate the invention.

| Example No. | 1 | 2 | 3 | 4 | 5 | 6 | 7 | 8 | 9 | 10 | 11 |
|---|---|---|---|---|---|---|---|---|---|---|---|
| $SiO_2$ | 39.1 | 50.0 | 45.3 | 45.2 | 28.7 | 28.2 | 33.5 | 32.6 | 27.5 | 26.8 | 32.4 |
| $Al_2O_3$ | 6.6 | 5.0 | 4.8 | 4.5 | 3.6 | 3.9 | 3.8 | 3.7 | 3.8 | 3.7 | 3.7 |
| $CaO$ | 13.8 | 19.0 | 18.5 | 17.3 | 14.0 | 15.1 | 15.0 | 14.6 | 14.8 | 14.4 | 14.5 |
| $MgO$ | 7.9 | 14.0 | 13.3 | 12.4 | 10.0 | 10.9 | 10.8 | 10.5 | 10.6 | 10.3 | 10.5 |
| $TiO_2$ | 22.6 | | | | 13.9 | 15.0 | 14.9 | 14.5 | 14.6 | 14.2 | 14.4 |
| $ZrO_2$ | | 12.0 | 11.5 | 10.8 | 8.6 | 9.4 | 9.3 | 9.0 | 9.1 | 8.9 | 9.0 |
| $HfO_2$ | | | | 9.8 | | | | | | | |
| $ThO_2$ | | | | | 11.2 | 12.1 | 12.0 | 11.8 | 11.8 | 11.5 | 11.8 |
| $Ta_2O_5$ | | | | | 9.4 | | | | | | |
| $Nb_2O_5$ | | | 6.6 | | | | | | | | |
| $MnO$ | | | | | | 4.0 | | | 3.9 | 3.8 | |
| $Li_2O$ | | | | | 0.6 | 1.4 | 0.7 | 0.7 | 1.3 | 1.3 | 0.7 |
| $BaO$ | 10.0 | | | | | | | | | | |
| $B_2O_3$ | | | | | | | | 2.6 | 2.6 | 5.1 | 2.6 |
| $CoO$ | | | | | | | | | | | 0.4 |
| Ex. $10^6$, p.s.i. | 14.8 | 15.2 | 16.1 | 17.2 | 17.5 | 18.0 | 17.5 | 17.0 | 17.5 | 17.0 | 17.0 |

For the manufacture of glass fibres, it is not necessary to anneal the glass in slab form; alternatively the glass may be left unannealed to break up under stress, or the glass may be quenched by pouring the molten composition into water. In both cases the pieces of glass so obtained are used for re-melting in a fibre-drawing furnace.

It has been found that glasses possessing high Young's moduli are likely to be drawn into fibres only with difficulty owing to their low viscosity above the liquidus temperature, their high surface tension and their tendency to devitrify on cooling at temperatures near to the liquidus temperature. In most cases, fibres may be drawn from such glasses by use of a technique which involves heating the glass to well above its liquidus temperature and rapidly chilling the glass as it emerges from the extrusion orifice by means of, for instance, air jets directed at the meniscus of the molten glass. The addition to a glass composition of small quantities of boric oxide has been found to ease these difficulties and in many cases, the tendency of a particular glass to devitrify may be reduced sufficiently to make the drawing of fibres possible without the use of rapid chilling as mentioned above. The glass having the composition of Example 6 can only be drawn into fibre form with difficulty but the addition of 2.6 percent boric oxide (and minor variations in the other constituents) made it possible to draw fibres continuously using only a small amount of air cooling on the glass meniscus below the orifice. Similarly air jets had to be used to enable the glass of Example 7 to be drawn into fibres. The addition of 2.6 percent boric oxide to this composition resulted in a glass from which fibres could be drawn without the use of any forced air cooling. Larger additions of boric oxide have been found to further ease the fibre drawing properties of a glass, but the addition of boric oxide does, however, lower the Young's modulus of the glass and desirably a compromise is struck between the fibre drawing properties and the Young's modulus of the glass. The glass compositions of Examples 8, 9 and 10 are typical of such compositions modified to aid fibre-drawing.

It has also been discovered that a further improvement in fibre-drawing characteristics can be achieved by the addition of the small amounts of cobalt oxide. This improvement is due, in all probability, to the high infra-red emission of cobalt oxide-containing glasses and such glasses will cool more quickly than a similar glass (Example 11) containing no cobalt oxide.

It has been observed that the behaviour of $HfO_2$ and $ZrO_2$ are very similar and that part of one in a composition may be replaced by a part of another. For example, a very similar glass may be prepared by adding to a base glass 20 percent $HfO_2$ or 9.5 percent $ZrO_2$. Alternatively, a glass having practically the same properties would be produced by use of 10 percent $HfO_2$ together with 4.75 percent $ZrO_2$.

I claim:

1. A substantially homogeneous glass composition, which has been fused and subsequently cooled, consisting essentially of a base glass having the following composition:

| | Percent |
|---|---|
| $SiO_2$ | From 20 to 50 |
| $Al_2O_3$ | From 0 to 20 |
| CaO | From 10 to 25 |
| MgO | From 7 to 22 | said glass composition having incorporated therein material to increase the Young's modulus of the base glass, said material being selected from the following group and being present within the range specified wherein the percentages are by weight based on the total weight of the composition:

| | Percent |
|---|---|
| $TiO_2$ | From 10 to 27 |
| $ZrO_2$ | From 8.5 to 20 |
| $HfO_2$ | From 8 to 15 |
| $ThO_2$ | From 10 to 25 |
| $Ta_2O_5$ | From 9.4 to 15 |
| $Nb_2O_5$ | From 5 to 20 | and mixtures thereof in the range of 10 to 45 percent, the total amount of each material being sufficient to increase the Young's modulus of the glass composition.

2. A substantially homogeneous glass composition, which has been fused and subsequently cooled, consisting essentially of a base glass having the following composition:

| | Percent |
|---|---|
| $SiO_2$ | From 20 to 50 |
| $Al_2O_3$ | From 0 to 20 |
| CaO | From 15 to 25 |
| MgO | From 10 to 22 | said glass composition having incorporated therein material to increase the Young's modulus of the base glass, said material being selected from the following group and being present within the range specified wherein the percentages are by weight based on the total weight of the composition:

| | Percent |
|---|---|
| $TiO_2$ | From 10 to 23 |
| $ZrO_2$ | From 10 to 18 |
| $HfO_2$ | From 8 to 13 |
| $ThO_2$ | From 12 to 22 |
| $Ta_2O_5$ | From 5 to 15 |
| $Nb_2O_5$ | From 5 to 15 | and mixtures thereof in the range of 10 to 45 percent, the total amount of each material being sufficient to increase the Young's modulus of the glass composition.

3. A substantially homogeneous glass composition, which has been fused and subsequently cooled, consisting essentially of a base glass having the following composition:

| | Parts |
|---|---|
| $SiO_2$ | From 25 to 50 |
| $Al_2O_3$ | From 3 to 10 |
| CaO | From 10 to 15 |
| MgO | From 7 to 15 | said glass composition having incorporated therein material to increase the Young's modulus of the base glass, said material being selected from the following group and being present within the range specified wherein the percentages are by weight based on the total weight of the composition:

| | Percent |
|---|---|
| $TiO_2$ | From 10 to 20 |
| $ZrO_2$ | From 8.5 to 12 |
| $HfO_2$ | From 8 to 10 |
| $ThO_2$ | From 10 to 12.5 | and mixtures thereof in the range of 10 to 45 percent, the total amount of each material being sufficient to increase the Young's modulus of the glass composition.

4. A composition as claimed in claim 1 wherein the base glass consists of:

| | Percent |
|---|---|
| $SiO_2$ | From 25 to 50 |
| $Al_2O_3$ | From 3 to 8 |
| CaO | From 10 to 20 |
| MgO | From 7 to 15 |

5. A composition as claimed in claim 4 wherein the base glass consists of $SiO_2$, $Al_2O_3$, CaO, and MgO present in a total amount of from 50 to 90 percent.

6. Glass fibres made from the composition claimed in claim 3.

7. A composition as claimed in claim 1 wherein there is incorporated from 0.1 to 2.0 percent of $Li_2O$.

8. A composition as claimed in claim 1 wherein there is incorporated from 0.1 to 5.0 percent of MnO.

9. A composition as claimed in claim 1 wherein the composition contains from 1 to 10 percent of $B_2O_3$.

10. A composition as claimed in claim 1 wherein there is also included CoO in an amount of from 0.05 to 1 percent.

11. A composition as claimed in claim 10 wherein the CoO is present in an amount of from 0.1 to 0.5 percent.

References Cited in the file of this patent

UNITED STATES PATENTS

| | | |
|---|---|---|
| 1,956,377 | Drill | Apr. 24, 1934 |
| 2,334,961 | Schoenlaub | Nov. 23, 1943 |
| 2,681,289 | Moore | June 15, 1954 |
| 2,685,527 | Labino | Aug. 3, 1954 |
| 2,978,341 | Bastian et al. | Apr. 4, 1961 |

FOREIGN PATENTS

| | | |
|---|---|---|
| 124,553 | Australia | June 26, 1947 |
| 810,773 | Great Britain | Mar. 25, 1959 |